United States Patent
Wada et al.

[11] Patent Number: 5,915,120
[45] Date of Patent: Jun. 22, 1999

[54] INFORMATION PROCESSING APPARATUS HAVING A POWER MANAGEMENT SYSTEM THAT DYNAMICALLY CHANGES OPERATING CONDITIONS BASED UPON DYNAMICALLY SELECTED USER PREFERENTIAL ORDER SETTING

[75] Inventors: Hiroshi Wada, Fujisawa; Hitoshi Kawaguchi, Yokohama; Masami Yamagishi, Ebina, all of Japan

[73] Assignee: Hitachi, Ltd., Tokyo, Japan

[21] Appl. No.: 08/855,447

[22] Filed: May 13, 1997

[30] Foreign Application Priority Data

May 14, 1996 [JP] Japan .................................. 8-119034

[51] Int. Cl.[6] ........................................................ G06F 1/00
[52] U.S. Cl. .................................. 395/750.02; 395/750.03
[58] Field of Search ............................ 395/750.01–750.08

[56] References Cited

U.S. PATENT DOCUMENTS

| | | | |
|---|---|---|---|
| 4,769,636 | 9/1988 | Iwami et al. ............................ | 345/340 |
| 5,493,685 | 2/1996 | Zenda ................................ | 395/750.08 |
| 5,532,935 | 7/1996 | Ninomiya et al. ................. | 364/528.31 |
| 5,560,022 | 9/1996 | Dunstan et al. .................... | 395/750.01 |
| 5,754,798 | 5/1998 | Uehara et al. .......................... | 395/284 |
| 5,758,172 | 5/1998 | Seo ..................................... | 395/750.01 |
| 5,822,123 | 10/1998 | Davis et al. ............................ | 348/564 |

OTHER PUBLICATIONS

Nikkei Electronics, Feb. 13, 1995, pp. 148–149.

Primary Examiner—Thomas C. Lee
Assistant Examiner—Harold J. Kim
Attorney, Agent, or Firm—Fay, Sharpe, Beall, Fagan, Minnich & McKee

[57] ABSTRACT

In an information processing apparatus having a central processing unit, input/output units controlled by the central processing unit such as a liquid crystal display, a hard disk drive, a PCMCIA controller and a floppy disk drive, and a battery for supplying power to the central processing unit and the input/output units, a desired operating time of the information processing apparatus is set in a desired operating time setting circuit. Next, a residual capacity detecting circuit detects a residual capacity of the battery. On the basis of the desired operating time set by the desired operating time setting circuit and an operable time of the information processing apparatus calculated from the residual capacity of the battery detected by the residual capacity detecting circuit, the central processing unit commands an operating condition changing circuit to change operating conditions such that the desired operating time becomes longer than the operable time. The operating condition changing circuit controls power consumption in the input/output units such that the changed operating conditions are met, thus ensuring the desired operable time of the information processing apparatus to be realized.

7 Claims, 13 Drawing Sheets

STATUS PARAMETERS

| | | | | | | |
|---|---|---|---|---|---|---|
| FD : | 0 | [1] | 2 | 3 | 4 | 5 | min |
| HD : | | [1] | 2 | 3 | 4 | 5 | min |
| Light : | | 1 | 2 | [3] | 4 | 5 | brg |
| CPU : | | 5 | [30] | 50 | 75 | 100 | clk |
| I/O : | | 5 | [8] | 15 | 20 | 33 | clk |

PREFERENTIAL ORDER TABLE

| | | | | | |
|---|---|---|---|---|---|
| FD : | 1 | ② | 3 | 4 | 5 |
| HD : | 1 | 2 | 3 | ④ | 5 |
| Light : | 1 | 2 | 3 | 4 | ⑤ |
| CPU : | 1 | 2 | ③ | 4 | 5 |
| I/O : | ① | 2 | 3 | 4 | 5 |

INFORMATION PROCESSING APPARATUS HAVING A POWER MANAGEMENT SYSTEM THAT DYNAMICALLY CHANGES OPERATING CONDITIONS BASED UPON DYNAMICALLY SELECTED USER PREFERENTIAL ORDER SETTING

BACKGROUND OF THE INVENTION

The present invention relates to information processing apparatus and more particularly to an information processing apparatus adopting a power management system.

The power management system is described in Nikkei Electronics, Feb. 13, 1995, pp. 148–149. Disclosed therein is a system for calculating a residual battery operable time on the basis of the relation among the residual capacity of a battery, the speed of a CPU, the speeds of peripheral units (I/O units) and the brightness of backlight of a liquid crystal display (LCD). In this system, the user of an information processing apparatus opens a menu screen by himself or herself and adjusts the speed of the CPU, the brightness of backlight and the non-access time which is used for deciding whether or not power to a hard disk drive (HD) is turned off to thereby change the residual battery operable time to a sufficient time.

SUMMARY OF THE INVENTION

In the prior art, the user must open the menu screen and perform troublesome adjustments of the speed of the CPU and the brightness of backlight until the battery operable time becomes sufficient and besides, several items of objects to be adjusted must be cleared, thus raising a problem that much time is required for the adjustments.

An object of the present invention is to provide an information processing apparatus adopting a power management system which can assure a desired battery operable time easily.

According to the present invention, to accomplish the above object, in an information processing apparatus having a central processing unit, input/output units controlled by the central processing unit and a battery for supplying power to the central processing unit and the input/output units, there are provided desired operating time setting means for setting a desired operating time of the information processing apparatus, operating condition changing means for changing operating conditions such as power to be supplied to the central processing unit and the input/output units and frequencies of operating clocks, and residual capacity detecting means for detecting a residual capacity of the battery, the central processing unit changes, on the basis of the desired operating time set by the desired operating time setting means and an operable time of the information processing apparatus based on the battery residual capacity detected by the residual capacity detecting means, the operating conditions such that the desired operating time becomes longer than the operable time, and controls the operating condition changing means so as to cause it to provide the changed operating conditions. With this construction, a desired operable time of the battery can be obtained easily.

Preferably, in the information processing apparatus, the central processing unit changes the operating conditions such that the desired operating time substantially equals the operable time when the operable time determined by the change of the operating conditions is longer than the desired operating time and controls the operating condition changing means so as to cause it to provide the changed operating conditions. With this construction, not only a desired operable time of the battery can be obtained easily but also optimum operating conditions can be obtained within the operable time.

Preferably, the information processing apparatus further comprises a preferential order table which is settable with preferential order ranks of the central processing unit and the input/output units, and the central processing unit controls, on the basis of the preferential order ranks set in the preferential order table, the operating condition changing means such that the desired operating time becomes longer than the operable time. With this construction, the power management system can be executed in accordance with the user oriented preferential order.

Preferably, the information processing apparatus is supplied with power from an external power source and further comprises external power supply detecting means for detecting the external supply of power, and when the central processing unit detects the external power supply on the basis of a detection signal from the external power supply detecting means under the condition that power is supplied from the battery to the central processing unit and the input/output units, it controls the operating condition changing means to cause it change the operating conditions such as power to be supplied to the central processing unit and the input/output units and the frequencies of the operating clocks such that the operating conditions are improved. With this construction, the operating conditions in conformity with the external supply of power can be set.

Preferably, the information processing apparatus is supplied with power from an external power source and further comprises external power supply detecting means for detecting the external supply of power, and when power is supplied externally, the central processing unit neglects, on the basis of a detection signal from the external power supply detecting means, information from the desired operating time setting means indicating that a desired operating time is set and maintains the operating conditions at present. With this construction, the operating conditions conforming to the external power supply can be set.

Preferably, the information processing apparatus is supplied with power from an external power source and further comprises external power supply detecting means for detecting the external supply of power, and when power is supplied externally upon start of electrical conduction to the information processing apparatus, the central processing unit controls, on the basis of a detection signal from the external power supply detecting means, the operating condition changing means such that the maximum operating conditions are obtained but when power is not supplied externally and when the operating conditions are controlled so as to be changed on the basis of setting of the operating condition changing means before start of electrical conduction, the central processing unit changes the operating conditions such that the desired operating time becomes longer than the operable time on the basis of a desired operating time set by the desired operating time setting means and an operable time of the information processing apparatus based on a residual capacity of the battery detected by the residual capacity detecting means and controls the operating condition changing means to cause it to provide the changed operating conditions. With this construction, the operating conditions conforming to the external supply of power can be set.

Preferably, in the information processing apparatus, the desired operating time setting means includes a display controller for converting an indication of desired operating time displayed on a display screen of a display which is one of the input/output units into time data of the desired operating time. With this construction, the desired operating time can be set without additional means.

Preferably, in the information processing apparatus, the desired operating time setting means includes a slidable switch provided for the information processing apparatus proper and a time determining circuit for converting a moving amount of the switch into time data. With this construction, the desired operating time can be set easily by operating the slide switch.

DESCRIPTION OF THE PREFERRED EMBODIMENTS

An information processing apparatus adopting a power management system according to a first embodiment of the present invention will be described with reference to FIGS. 1 to 7.

Figure 1:
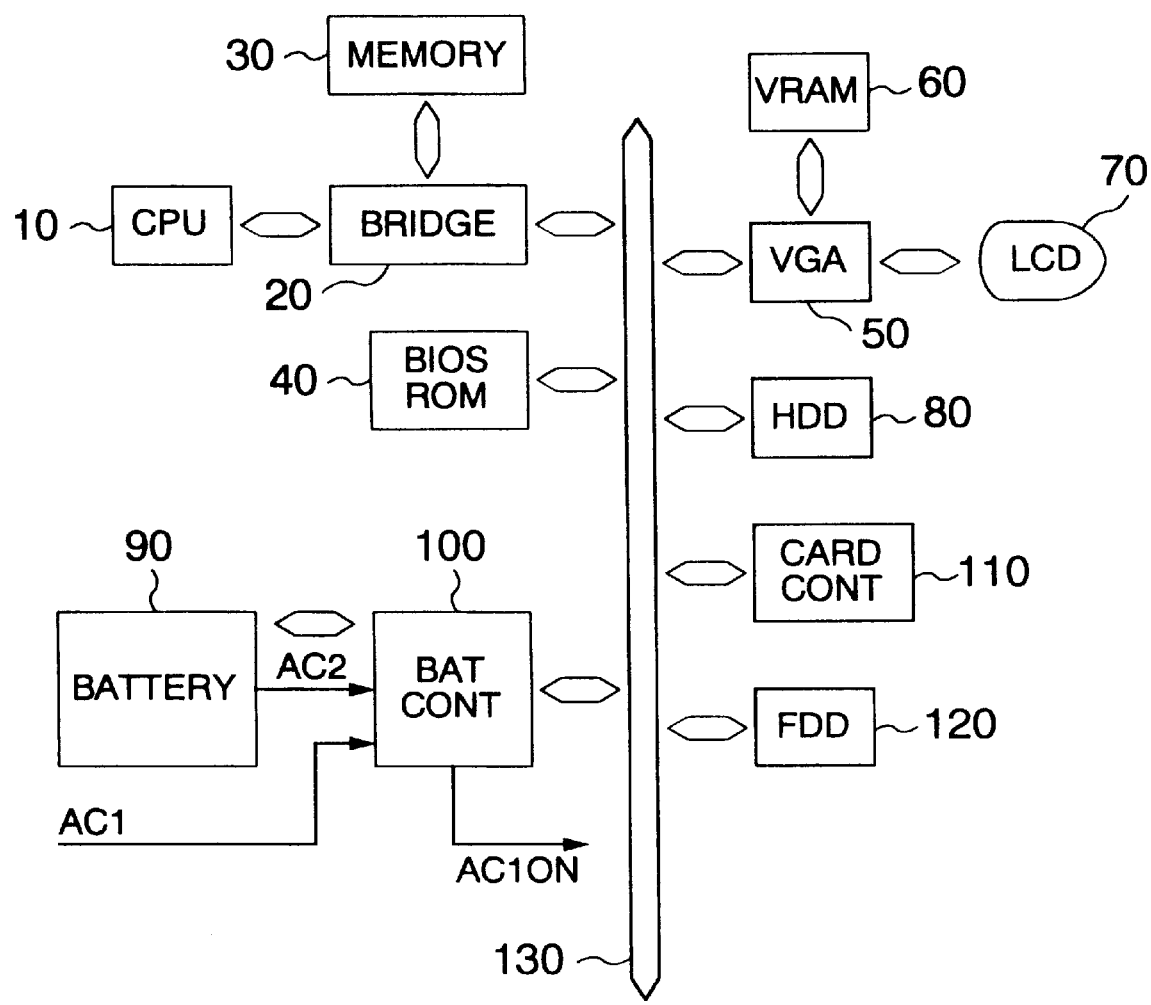
FIG. 1 is a block diagram showing the overall construction of an information processing apparatus according to a first embodiment of the present invention.

Referring first to FIG. 1, the overall construction of the information processing apparatus according to the present embodiment is shown in block diagram form.

The information processing apparatus of the present embodiment is represented by, for example, a note type personal computer (PC) or a word processor.

In FIG. 1, a central processing unit (CPU) 10 controls the whole of the information processing apparatus according to the present embodiment. A bridge 20 controls interchange of data between the CPU 10 and a main memory 30 and between the CPU 10 and various peripheral units and supplies operating clocks to the CPU 10 and the peripheral units. A BIOS (Basic Input Output System) ROM 40 stores a program of the process for start-up of the information processing apparatus following turn-on of a power source.

A display controller 50 generates a display signal for causing a liquid crystal display (LCD) 70 to perform a screen display. A display memory (VRAM) 60 temporarily stores display data to be displayed on the liquid crystal display 70.

There are provided external storage units including a hard disk drive (HDD) 80 and a floppy disk drive (FDD) 120. A PCMCIA controller (CARD CONT) 110 controls read/write of a PC card.

A battery controller 100 converts direct current (DC) voltage AC2 from a battery 90 which is a chargeable power source or alternating current (AC) voltage AC1 supplied from an external AC power source through, for example, a plug socket into DC voltage so as to supply power to individual units in the information processing apparatus. When receiving AC power from the external power source, the battery controller 100 delivers a signal AC1ON to inform the CPU 10 that power is supplied from the external AC power source.

The bridge 20, BIOS ROM 40, display controller 50, hard disk drive 80, floppy disk drive 120, PCMCIA controller 110 and battery controller 100 are coupled to each other by a bus line 130.

Figure 2:
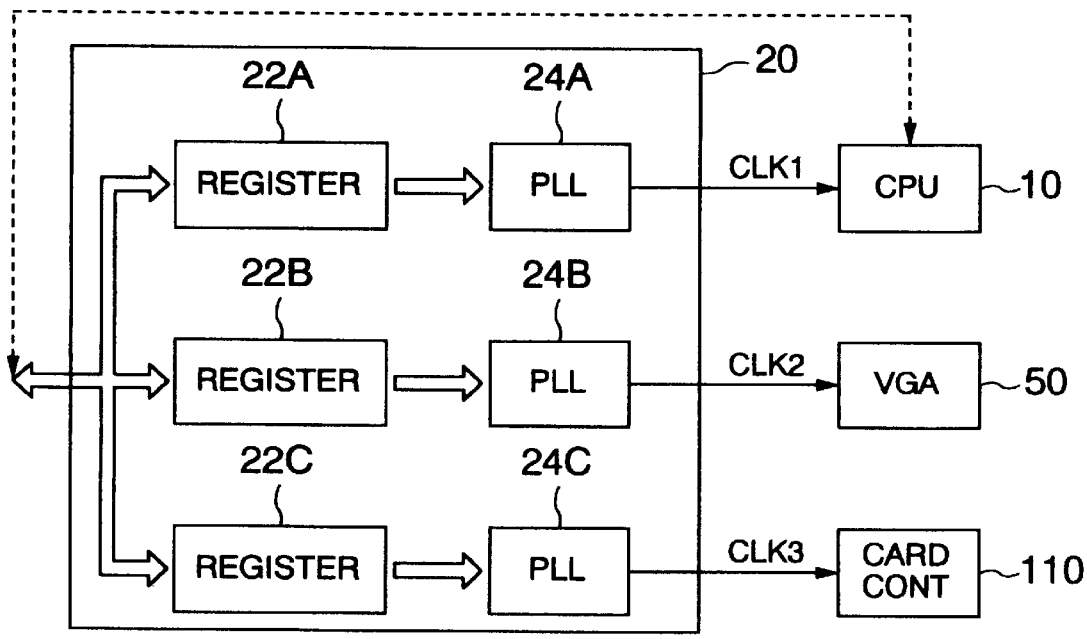
FIG. 2 is a block diagram showing a construction of a bridge in the information processing apparatus of FIG. 1.

Turning to FIG. 2, details of construction of the bridge 20 will be described.

The construction of the bridge in the information processing apparatus according to the present embodiment is shown in block diagram form in FIG. 2.

The bridge 20 supplies operating clocks CLK1, CLK2 and CLK3 to the CPU 10, display controller 50, PCMCIA controller (CARD CONT) 110, respectively. It is not always necessary that the operating clocks CLK1, CLK2 and CLK3 have the same frequency.

The bridge 20 includes a plurality of registers 22A, 22B and 22C into which values can be written externally of the bridge 20 and a plurality of PLL (Phase Locked Loop) circuits 24A, 24B and 24C. The operation of the PLL circuits is known in the art and will not be detailed here.

The operating clock CLK1 generated by the PLL circuit 24A has a frequency which is determined by a value written in the register 22A. In this case, for example, the higher the value of the register 22A, the higher the frequency of the operating clock CLK1 becomes. The registers 22B and 22C and PLL circuits 24B and 24C operate similarly.

The lower the frequency of the operating clocks CLK1, CLK2 and CLK3, the lower the power consumed by the CPU 10, display controller 50 and PCMCIA controller 110 becomes. Therefore, when the residual capacity of the battery 90 is small, power consumption is decreased by decreasing the frequency of the operating clocks CLK1, CLK2 and CLK3. When the information processing apparatus proper is supplied with power externally, the information processing apparatus proper can give full play to its function by increasing the frequency of the operating clocks CLK1, CLK2 and CLK3.

Since data pieces to be written in the registers 22A, 22B and 22C are sent from the CPU 10, the frequencies of the operating clocks CLK1, CLK2 and CLK3 for the CPU 10, display controller 50 and PCMCIA controller 110 can be controlled by means of the CPU 10. Details of the control operation will be described hereinafter.

Figure 3:
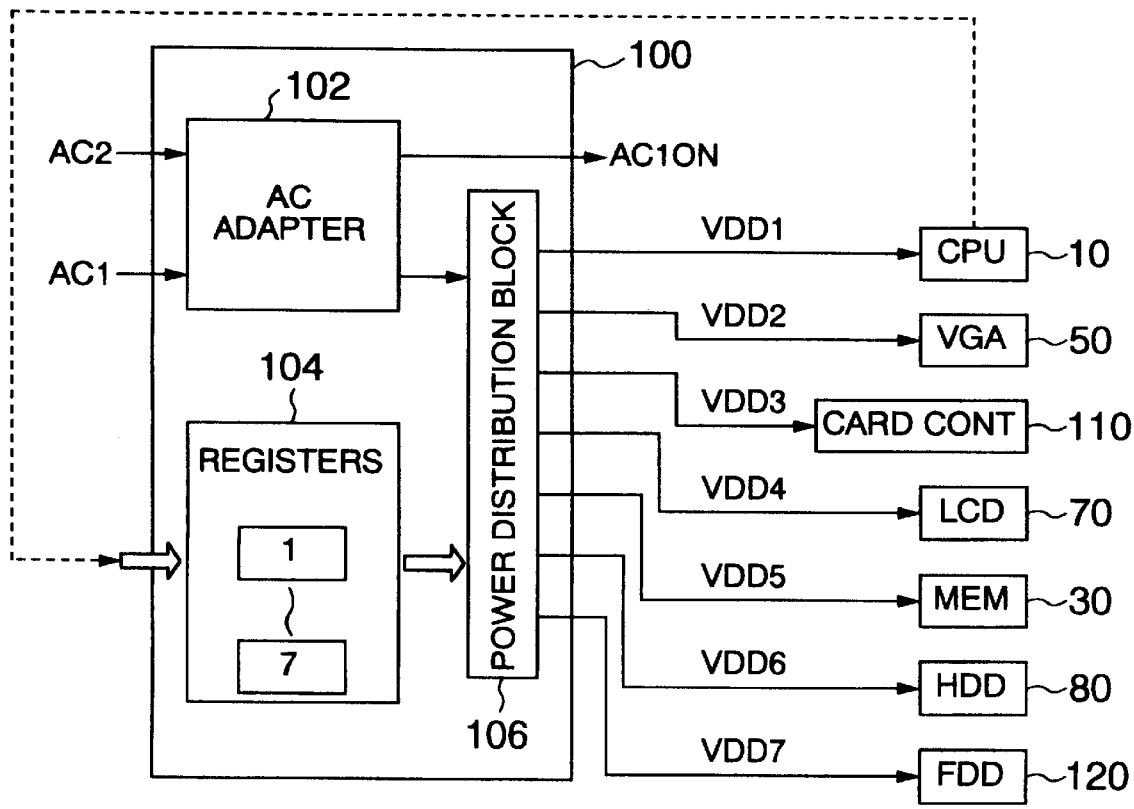
FIG. 3 is a block diagram showing a construction of a battery controller in the information processing apparatus of FIG. 1.

Referring now to FIG. 3, details of construction of the battery controller 100 will be described.

The construction of the battery controller in the information processing apparatus according to the present embodiment is illustrated in block diagram form in FIG. 3.

The battery controller 100 supplies power of DC voltage AC2 or AC voltage AC1 to the CPU 10, display controller 50, PCMCIA controller 110, liquid crystal display (LCD) 70, main memory 30, hard disk drive (HDD) 80 and floppy disk drive (FDD) 120, respectively, in the form of DC voltages VDD1 to VDD7. It is not always necessary that the DC voltages VDD1 to VDD7 be equal to each other.

Next, the internal construction of the battery controller 100 will be described.

An AC adapter 102 includes an AC/DC converter circuit for converting the AC voltage AC1 into a DC voltage and a switch circuit for selecting the DC voltage AC2 from the battery 90 or the DC voltage as a result of the conversion by the AC/DC converter circuit. When the AC voltage AC1 is supplied externally, the AC adapter 102 supplies the DC voltage resulting from the conversion by the AC/DC converter circuit to a power distributor block 106 and at the same time delivers the signal AC1ON. When the AC voltage AC1 is not supplied externally, the AC adapter 102 supplies the DC voltage AC2 from the battery 90 to the power distributor block 106.

The power distributor block 106 distributes the power supplied from the AC adapter 102 to the CPU 10, display controller 50, PCMCIA controller 110, liquid crystal display (LCD) 70, main memory 30, hard disk drive (HDD) and floppy disk drive (FDD) 120.

A register group 104 including registers 1 to 7 can be written with values externally of the battery controller 100. For example, the voltage VDD1 is determined by a value written into the register 1. The voltages VDD2 to VDD7 are determined similarly. For example, when the value of register is "0", the VDD is turned off and as the value increases, the voltage VDD increases.

Since data pieces written into the respective registers of the register group 104 are sent from the CPU 10, voltages of the VPU 10, display controller 50, PCMCIA controller 110, liquid crystal display (LCD) 70, main memory 30, hard disk drive (HDD) 80 and floppy disk drive 120 can be controlled by means of the CPU 10.

Here, the voltages VDD1, VDD2, VDD3 and VDD5 supplied to the CPU 10, display controller 50, PCMCIA controller 110 and main memory 30, respectively, are normally set to a constant voltage. The voltage VDD4 to be supplied to the liquid crystal display (LCD) 70 is supplied for backlight and can be switched stepwise through a plurality of steps. The voltages VDD 6 and VDD7 to be supplied to the hard disk drive (HDD) 80 and floppy disk drive (FDD) 120 can be switched on or off and they are switched off when the hard disk drive (HDD) 80 and the floppy disk drive (FDD) 120 are not accessed for a predetermined time (when non-access time exceeds a predetermined value). Details of the above control operation will be described later.

Figure 4:
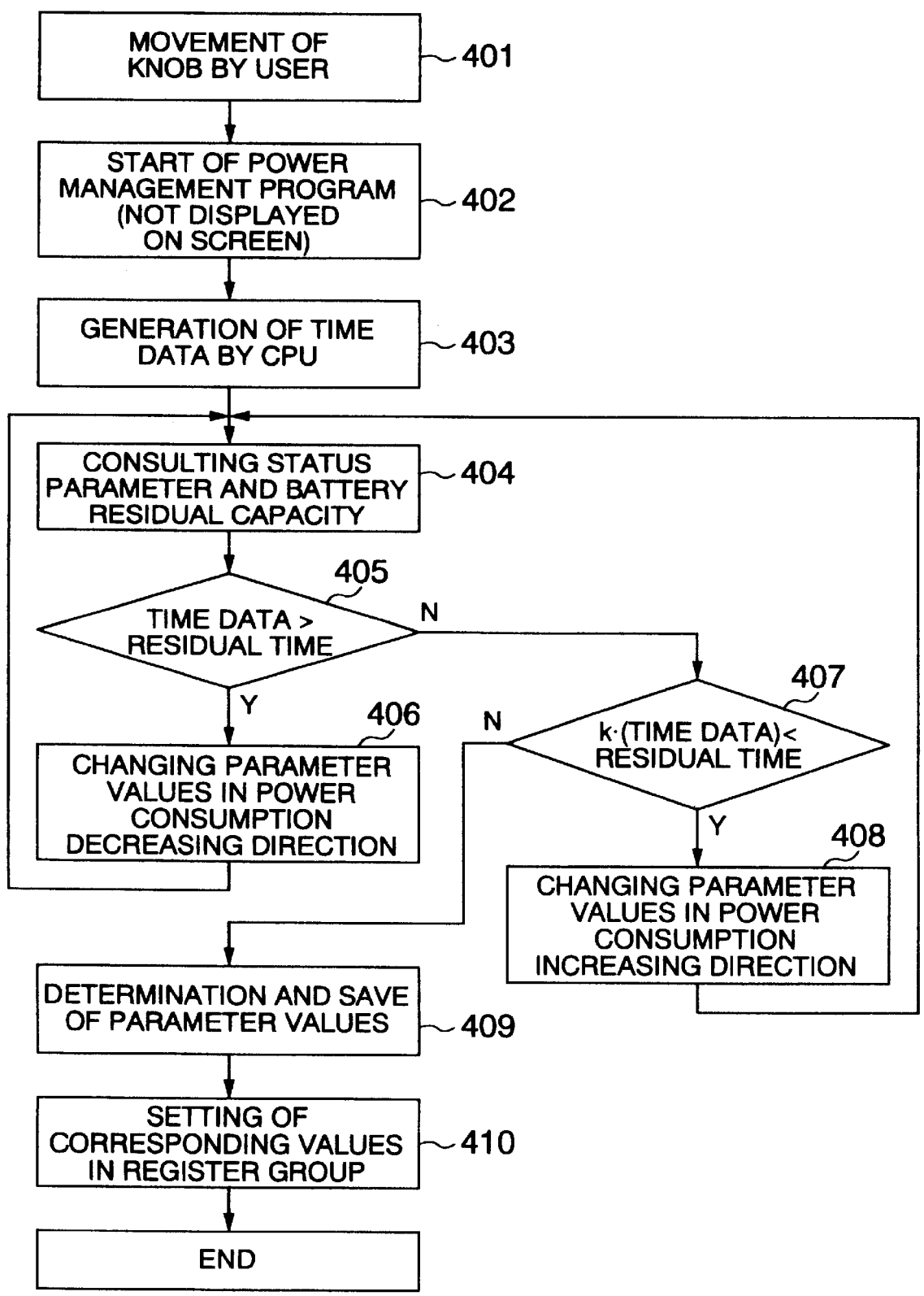
FIG. 4 is a flow chart for explaining control of a power management system in an information processing apparatus according to the first embodiment of the present invention.

Referring now to FIG. 4, control of voltage and operating clocks in accordance with a power management system will be described.

A flow chart for explaining control of the power management system in the information processing apparatus according to the present embodiment is shown in FIG. 4.

To set up the power management mode, function keys of the keyboard of the personal computer or word processor are operated. With the keys operated, a display as shown in FIG. 5 appears on the liquid crystal display 70 of the personal computer or the word processor.

Figures 5, 6:
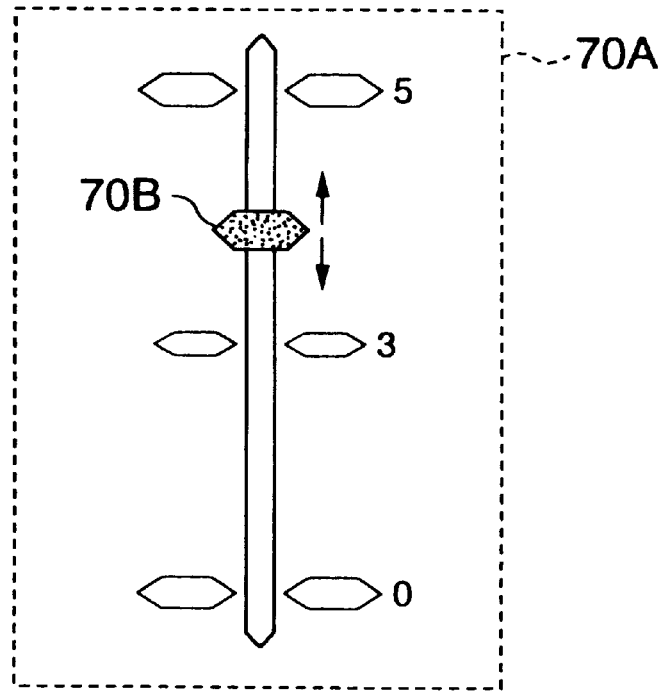
FIG. 5 is a diagram for explaining the display screen of a liquid crystal display in the information processing apparatus according to the first embodiment of the present invention.
FIG. 6 is a diagram for explaining status parameters in the information processing apparatus according to the first embodiment of the present invention.

FIG. 5 is for explaining the display screen of the liquid crystal display in the information processing apparatus according to the present embodiment.

A knob 70B is displayed on a display screen 70A of the liquid crystal display 70. Scales indicative of time are graduated sidewise of the knob 70B. The user is allowed to determine a desired battery operating time, that is, a desired operating time of the information processing apparatus by moving the knob through the use of an input device such as a mouse or the keyboard. In the illustration, a value between 3 hours and 5 hours is indicated.

In step 401, the user moves the knob 70B shown in FIG. 5 and then the CPU 10 detects the movement of the knob 70B.

In step 402, after detecting the movement of the knob, the CPU 10 starts the program for bringing the information processing apparatus (PC) into the power management mode and the power management is turned on.

Next, in step 403, the CPU 10 generates time data conforming to setting of adjustment of the knob. Here, time data is converted from data of a display position of the knob 70B on the display screen shown in FIG. 5 and represents data of a concrete desired operating time for which the user desires the information processing apparatus to be operated.

In step 404, the CPU 10 calculates a battery operable time by consulting status parameters and a battery residual capacity. Here, the status means operating conditions of the information processing apparatus, including the residual capacity of the battery, the speed of the CPU, the brightness of backlight and the non-access times for which power to the HD and FD is turned off. Excepting the residual capacity of the battery, the above factors are preferably prepared in a format of status parameters as will be described below with reference to FIG. 6.

FIG. 6 is for explaining status parameters in the information processing apparatus according to the present embodiment.

For example, as shown in FIG. 6, status parameters are non-access time "FD" (minutes) of the floppy disk drive (FDD) 120, non-access time "HD" (minutes) of the hard disk drive (HDD) 80, brightness "Light" (luxes) of backlight of the liquid crystal display (LCD) 70, operating clock "CPU" of the CPU 10 (in terms of frequency (MHz) of operating clock) and operating clocks "I/O" of the input/output units such as the display controller 50 and PCMCIA controller 110 (in terms of frequency (MHz) of operating clock).

In FIG. 6, whitely stamped numerals on black square background represent statuses at present. More specifically, the non-access time of the floppy disk drive (FDD) 120 is 1 (minute), the non-access time of the hard disk drive (HDD) 80 is 1 (minute) and the brightness of backlight of the liquid crystal display (LCD) 70 is 3 (luxes). Further, it is indicated that in connection with operating clocks, the operating clock of the CPU 10 is 30 (MHz) and the operating clock of the input/output units such as the display controller 50 and PCMCIA controller 110 is 8 (MHz).

These status parameters are stored in the main memory 30 and are rewritable as desired.

Next, in step 405, the CPU 10 compares the time data indicative of a desired operating time of the information processing apparatus inputted by the user in step 401 with the battery operable time calculated in step 404. If the time data is longer than the battery operable time, the program proceeds to step 406 but if shorter, the program proceeds to step 407.

Since the desired operating time is longer than the operable time, the CPU 10 changes values of the status parameters in a direction of decreasing the power consumption in the step 406.

The process of decreasing the power consumption will now be described using the status parameters shown in FIG. 6. In the CPU 10, the order of downgrading the status parameters is determined in advance. For example, the downgrading order is such that the operating clock of the CPU 10 is first downgraded by one step from 30 (MHz) to 5 (MHz). When this process ends, the program returns to the steps 404 and 405 and again reaches the step 406 in which the brightness of backlight of the liquid crystal display (LCD) 70 is downgraded next from 3 (luxes) to 2 (luxes). Subsequently, the operating clock of the input/output units is downgraded from 8 (MHz) to 5 (MHz). In this manner, the order of downgrading is predetermined and adjustment proceeds in accordance with the downgrading order. When the time data becomes shorter than the battery operable time, the program proceeds to the step 407.

In the step 407, the CPU 10 compares a value obtained by multiplying the time data indicative of the desired operating time of the information processing apparatus inputted by the user by a constant k (k>1) with the battery operable time calculated in the step 404. If k(time data) is shorter than the battery operable time, the program proceeds to step 408 but if longer, the program proceeds to step 409. Here, the constant k has a value of, for example, about 1.1. More particularly, if the power consumption is over controlled in its decreasing direction in the step 406 and the operable time becomes exaggeratedly longer than the desired operating time, the operating conditions of the information processing apparatus are downgraded, giving rise to a decrease in operating speed and darkening of the liquid crystal display screen. To avoid such an inconvenience, the constant k is introduced which is set to the above value.

In the step 408, by reflecting the fact that the desired operating time is exaggeratedly shorter than the operable time, the CPU 10 changes values of the status parameters in a direction of increasing the power consumption. In the changing process, the individual parameters are upgraded in order in contrast to the downgrading described in connection with the step 406.

The processes of steps 404, 405, 406 and 407 are repeated until the battery operable time substantially equals the time data and then the program proceeds to the step 409.

In the step 409, the CPU 10 saves values of the status parameters at that time in the memory 30.

Next, in step 410, the CPU 10 writes values corresponding to the status parameters at that time in the registers 22A, 22B and 22C of the bridge 20 shown in FIG. 2 and in the register group 104 of the battery controller 100 shown in FIG. 3. This allows the bridge 20 to generate operating clocks CLK1 to CLK3 at a frequency or frequencies corresponding to the written values and the battery controller 100 to generate voltages VDD1 to VDD7 corresponding to the written values.

In the event that even with the speed of the CPU and the brightness of backlight downgraded, the battery operating time desired by the user cannot be obtained, a message to this effect such as an alarm may be raised. In this case, the maximum operating time may also be indicated clearly.

While in the foregoing description the time data is so controlled as to substantially equal the residual time by repeating the steps 405 to 408, the program may shifts to the step 409 at the time that the decision result in the step 405 turns to taking "NO", that is, the time data becomes smaller than the residual time. Through this, the processing time of the power management system can be reduced.

According to the present embodiment, the power management system as described above is employed, so that the user can assure a desired battery operable time easily by merely adjusting the knob on the screen and designating a desired operating time of the information processing apparatus.

Conventionally, the battery is consumed even while the user adjusts the speed of the CPU and the brightness of backlight until a sufficient battery operable time is reached and consequently, the battery operable time is shortened by the time required for the adjustment. In the present embodiment, however, adjustment can be finished within a very short time and hence the consumption of the battery can be prevented.

Figure 7:
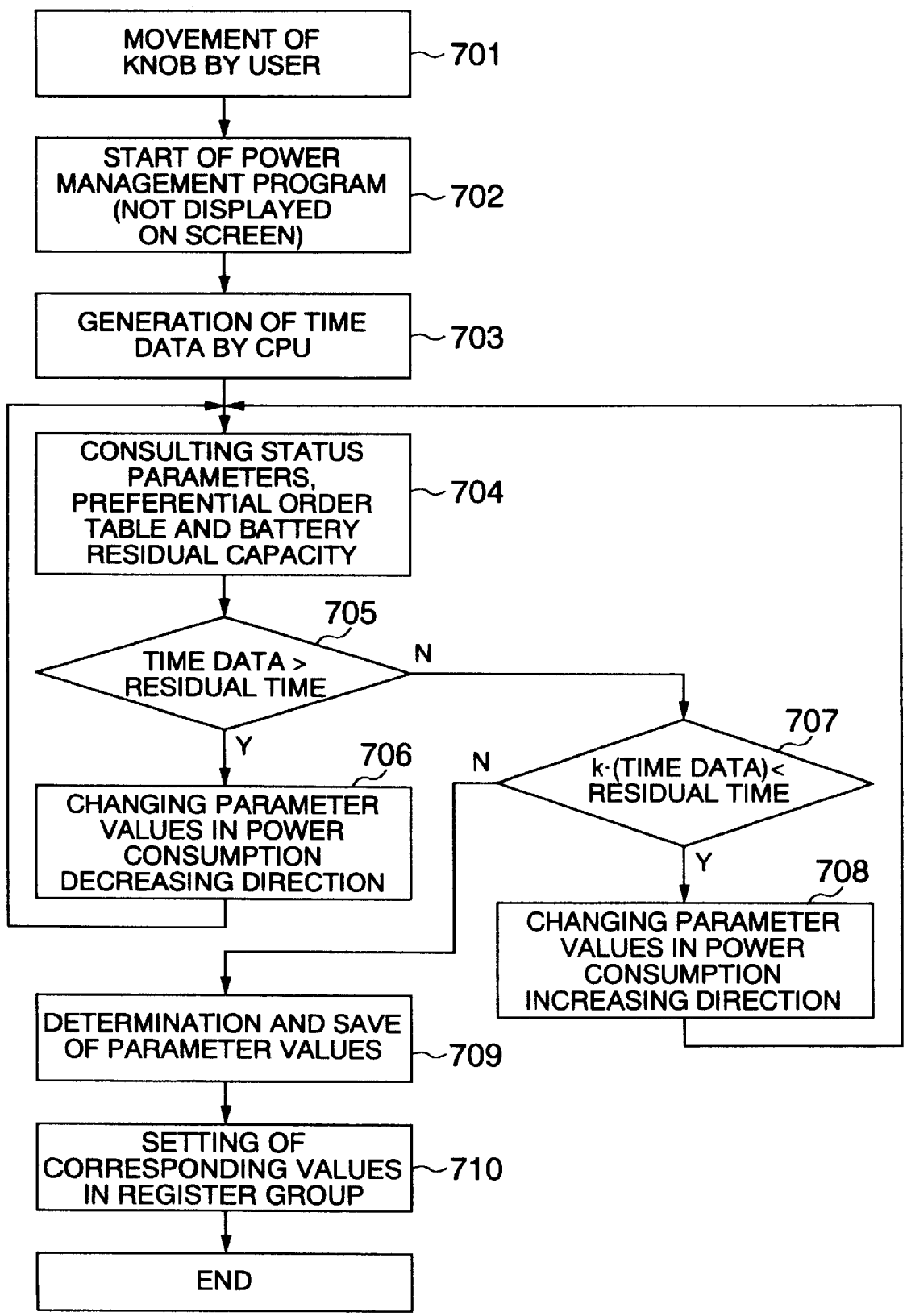
FIG. 7 is a flow chart for explaining control of a power management system in an information processing apparatus according to a second embodiment of the present invention.

Referring now to FIG. 7, a second embodiment will be described in which voltage and operating clocks are controlled pursuant to a power management system using a preferential order table settable with preferential order by the user.

A flow chart of FIG. 7 is for explaining control of the power management system in the information processing apparatus according to the present embodiment.

The preferential order of the performance such as the speed of the CPU, the brightness of backlight and the frequency of the hard disk drive (HDD) or the like changes with preference of the user. Accordingly, in the present embodiment, a preferential order table is prepared and when status parameter values are changed, the preferential order table is consulted. Details of the preferential order table will be described later with reference to FIG. 8.

In FIG. 7, the operation to be carried out in steps 701 to 703 is the same as that in the steps 401 to 403 of FIG. 4 and will not be detailed here but generally, when the user moves the knob on the display screen in the step 701, the program of the power management mode is started in the step 702 and subsequently, the CPU 10 generates time data in accordance with setting of adjustment of the knob in the step 703.

Next, in step 704, the CPU 10 calculates a battery operable time by consulting status parameters, the preferential order table and a battery residual capacity. Here, the status means operating conditions of the information processing apparatus, including the residual capacity of the battery, the speed of the CPU, the brightness of backlight and the non-access times for which power to the HD and FD is turned off. As status parameters, those shown in FIG. 6, for example, are used.

The preferential order table will now be described with reference to FIG. 8.

Figures 8, 9:
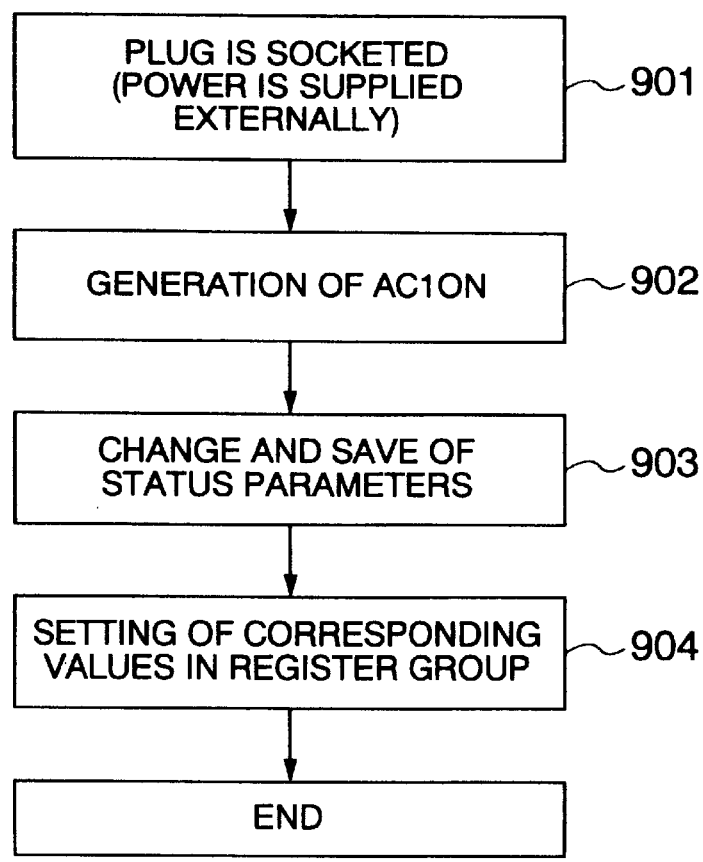
FIG. 8 is a diagram for explaining a preferential (priority) order table used in the information processing apparatus according to the second embodiment of the present invention.
FIG. 9 is a flow chart for explaining control of a power management system in an information processing apparatus according to a third embodiment of the present invention.

FIG. 8 is for explaining the preferential order table used in the information processing apparatus according to the present embodiment.

As shown in FIG. 8, items in the preferential order table are, for example, non-access time "FD" of the floppy disk drive (FDD), non-access time "HD" of the hard disk drive (HDD) 80, brightness "Light" of backlight of the liquid crystal display (LCD) 70, operating clock "CPU" of the CPU 10, and operating clock "I/O" of the input/output units such as display controller 50 and PCMCIA controller 110.

Ranks "1" to "5" of the preferential order are assigned to each of the items. The larger the numeral of the preferential order rank, the higher the preferential order becomes, and the smaller the numeral, the lower the preferential order becomes.

In FIG. 8, encircled numerals represent preferential order ranks at present. More specifically, the non-access time of the floppy disk drive (FDD) 120 has a preferential order rank of "2" and the non-access time of the hard disk drive (HDD) 80 has a preferential order rank of "4". The brightness of backlight of the liquid crystal display (LCD) 70 has a preferential order rank of "5". Also, it is indicated that in connection with operating clocks, the operating clock of the CPU 10 has a preferential order rank of "3" and the operating clock of the input/output units such as the display controller 50 and the PCMCIA controller 110 has a preferential order rank of "1". Namely, in the example shown in FIG. 8, setting is such that the brightness of backlight of the liquid crystal display (LCD) 70 is of the highest preferential order and the operating clock of the input/output units is of the lowest preferential order.

The contents of the preferential order table is stored in the memory 30 and can be rewritten as desired. For example, by displaying the preferential order table shown in FIG. 8 on the display screen and moving a cursor on the numerals or clicking a mouse to designate numerals, the user can change the setting easily.

Next, in step 705, the CPU 10 compares the time data indicative of a desired operating time of the information processing apparatus inputted by the user in the step 701 with the battery operable time calculated in the step 704. If the time data is longer than the battery operable time, the program proceeds to step 706 but if shorter, the program proceeds to step 707.

Since the desired operating time is longer than the operable time, the CPU 10 changes values of the status parameters in a direction of decreasing the power consumption in the step 706. The process of decreasing the power consumption will now be described using the status parameters shown in FIG. 6 and the preferential order table shown in FIG. 8.

In the power consumption reduction processing in the step 706, the status is downgraded in sequence, starting from an item corresponding to lower one of the preferential order ranks set in the preferential order table. More particularly, since the operating clock "I/O" of the input/output units has the lowest preferential order rank, the operating clock "I/O" of the input/output units such as display controller 50 and PCMCIA controller 110 is first downgraded from 8 (MHz) to 5 (MHz).

When this process ends, the program returns to the steps 704 and 705 and again reaches the step 706 in which the non-access time of the floppy disk drive (FDD) 120 having a secondly low preferential order rank is downgraded from 1 (minute) to 0 (minute). In other word, the power source to the floppy disk drive (FDD) 120 is turned off. Subsequently, the operating clock of the CPU 10 is degraded from 30 (MHz) to 5 (MHz). In this manner, the statuses are downgraded rank by rank in sequence, starting from the item corresponding to lower one of the preferential order ranks set in the preferential order table. When one cycle of downgrading throughout the preferential order items ends, downgrading is again effected, starting from an item corresponding to the lowest preferential order. At that time, if the status corresponding to the lowest preferential order is at the lowest rank, the status corresponding to a secondly low preferential order is downgraded. When the time data becomes shorter than the battery operable time, the program proceeds to the step 707.

In the step 707, the CPU 10 compares a value obtained by multiplying the time data indicative of the desired operating time of the information processing apparatus inputted by the user in the step 701 by a constant k (k>1) with the battery operable time calculated in the step 704. If k·(time data) is shorter than the battery operable time, the program proceeds to step 708 but if longer, the program proceeds to step 709. Here, the constant k has a value of about 1.1. More particularly, if the power consumption is over controlled in the step 706 and the operable time becomes exaggeratedly longer than the desired operating time, the operating conditions of the information processing apparatus are downgraded, giving rise to a decrease in operating speed and darkening of the liquid crystal display screen. To avoid such an inconvenience, the constant k is introduced which is set to the above value.

In the step 708, by reflecting the fact that the desired operating time is exaggeratedly shorter than the operable time, the CPU 10 changes values of the status parameters in a direction of increasing the power consumption. In the changing process, too, the preferential order table shown in FIG. 8 is used and the status is upgraded in sequence, starting from an item corresponding to higher one of the preferential order ranks. For example, since the brightness "Light" of backlight of the liquid crystal display (LCD) 70 has the highest preferential order rank, this status is upgraded from 3 (luxes) to 4 (luxes). Thereafter, the steps 704, 705 and 707 are executed until the step 708 is again reached in which the non-access time "HD" of the hard disk drive (HDD) 80 having a secondly high preferential order rank is upgraded from 1 (minute) to 2 (minutes).

The processes of the steps 704, 705, 706 and 707 are repeated until the battery operable time substantially equals the time data and the program proceeds to the step 709.

The operation to be carried out in steps 709 and 710 is the same as that in the step 409 and 410 shown in FIG. 4 and the CPU 10 saves values of the status parameters at that time in the memory 30 in the step 709 and, in the step 710, sets values corresponding to the status parameters at that time in the registers 22A, 22B and 22C, respectively, of the bridge 20 shown in FIG. 2 and in the register group 104 of the battery controller 100 shown in FIG. 3.

In the event that even with the speed of the CPU and the brightness of backlight downgraded, a battery operating time desired by the user cannot be obtained, a message to this effect such as an alarm may be raised. Further, in this case, the maximum operating time may also be indicated clearly.

While in the foregoing description the time data is so controlled as to substantially equal the residual time by repeating the steps 705 to 708, the program may shifts to the step 709 at the time that the decision result in the step 705 turns to taking "NO", that is, the time data becomes smaller than the residual time. Through this, the processing time of the power management system can be reduced.

In the above description, the steps 706 and 708 are executed in accordance with the preferential order ranks set in the preferential order table. Obviously, in the operation to be carried out in the steps 704 to 708, the preferential order table may be consulted in a way different from that described as above. For example, in the step 706, the status parameters may not be downgraded starting from an item corresponding to lower one of the preferential order ranks but a status parameter value corresponding to an item having a preferential order rank which is imminently larger than the other may be downgraded. For example, the brightness "Light" of backlight of the liquid crystal display (LCD) 70 may be downgraded.

In the step 708, too, the status parameters may not be upgraded starting from an item corresponding to higher one of the preferential order ranks but a status parameter value corresponding to an item having a preferential order rank which is imminently lower than the other may be upgraded. For example, the non-access time "FD" of the floppy disk drive (FDD) 120 or the non-access time "HD" of the hard disk drive (HDD) 80 shown in FIG. 6 may be upgraded. Further, in an instance where the status parameters have values which are imminently larger and lower than the other, a certain rule may be established between the status parameter value and the preferential order table and the status parameter value may be changed in accordance with the rule.

According to the present embodiment, the power management system as described above is employed, so that the user can assure a desired battery operable time easily by merely adjusting the knob on the screen and designating a desired operating time of the information processing apparatus.

Conventionally, the battery is consumed even while the user adjusts the speed of the CPU and the brightness of backlight until a sufficient battery operable time is reached and consequently, the battery operable time is shortened by the time required for the adjustment. In the present embodiment, however, adjustment can be finished within a very short time and hence the consumption of the battery can be prevented.

Since the preferential order table settable by the user is used to execute the process of decreasing the power consumption and the process of increasing the power consumption in accordance with the preferential order, the power management can be executed in conformity with the user-oriented preferential order.

Referring now to FIG. 9, a description will be given of the operation in the case where while the information processing apparatus is operating in the power management mode, a plug is socketed and power is supplied externally of the information processing apparatus.

A flow chart of FIG. 9 is for explaining control of a power management system in an information processing apparatus according to a third embodiment of the present invention.

When the plug is socketed by the user to permit power to be supplied externally in step 901, the AC adapter 102 of the battery controller 100 shown in FIG. 2 makes active a signal AC1ON indicating that the plug is socketed to supply power in step 902.

In step 903, the CPU 10 detects the activated signal AC1ON and thereafter executes a program for ending the power management mode of the information processing apparatus. By the execution of this program, values of the status parameters shown in FIG. 6 are changed to their maximum values and the thus changed status parameter values are saved in the memory 30. The status parameter values are described as being changed to their maximums but it is not always necessary that the values be changed to their maximums. But, since power is supplied externally and power consumption is of no matter, the status parameter values are preferably changed to their maximums in order to place the information processing apparatus in the best operating condition.

In step 904, the CPU writes values corresponding to the changed status parameter values in the registers 22A, 22B and 22C of the bridge 20 shown in FIG. 2 and in the register group 104 of the battery controller 100 shown in FIG. 3. This allows the bridge 20 to generate clocks CLK1 to CLK3 at a frequency or frequencies corresponding to the written values and the battery controller 100 to generate voltages VDD1 to VDD7 corresponding to the written values.

According to the present embodiment, when power is supplied externally, the information processing apparatus can automatically be shifted to an operating condition conforming to the external supply of power.

Figure 10:
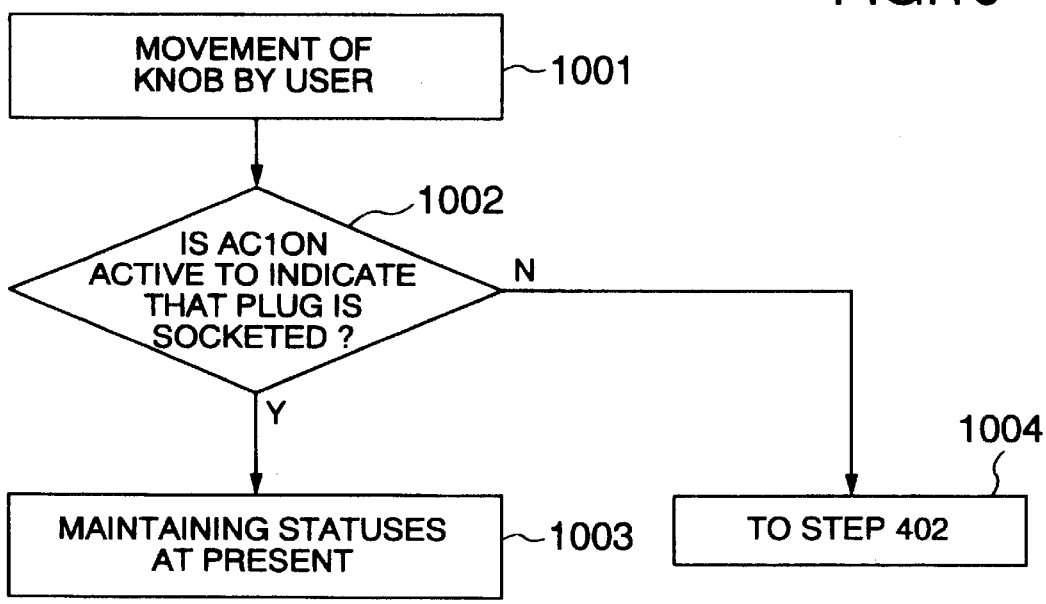
FIG. 10 is a flow chart for explaining control of a power management system in an information processing apparatus according to a fourth embodiment of the present invention.

Referring to FIG. 10, a description will be given of the operation when the user moves the knob in accordance with the presence or absence of power supplied externally of the information processing apparatus.

A flow chart of FIG. 10 is for explaining control of a power management in an information processing apparatus according to a fourth embodiment of the present invention.

In step 1001, when the user moves the knob 70B shown in FIG. 5 by using, for example, a mouse, the CPU 10 detects the movement of the knob 70B.

In step 1002, the CPU 10 decides whether the plug of the information processing apparatus is socketed and power is supplied externally. In this process, it is detected whether or not the signal AC1ON delivered out of the battery controller 100 shown in FIG. 3 is active and if active, the program proceeds to step 1003 but if inactive, the program proceeds to step 1004.

In the step 1003, by reflecting the fact that power is supplied externally, the CPU 10 maintains the status at present.

In the step 1004, by reflecting the fact that power is not supplied externally, the program proceeds to the step 402 of the flow chart shown in FIG. 4 and the CPU 10 executes the operation in the power management mode.

According to the present embodiment, even with the knob moved by the user, the information processing apparatus can be set to a proper operating condition in accordance with the presence or absence of external supply of power at that time.

Figure 11:
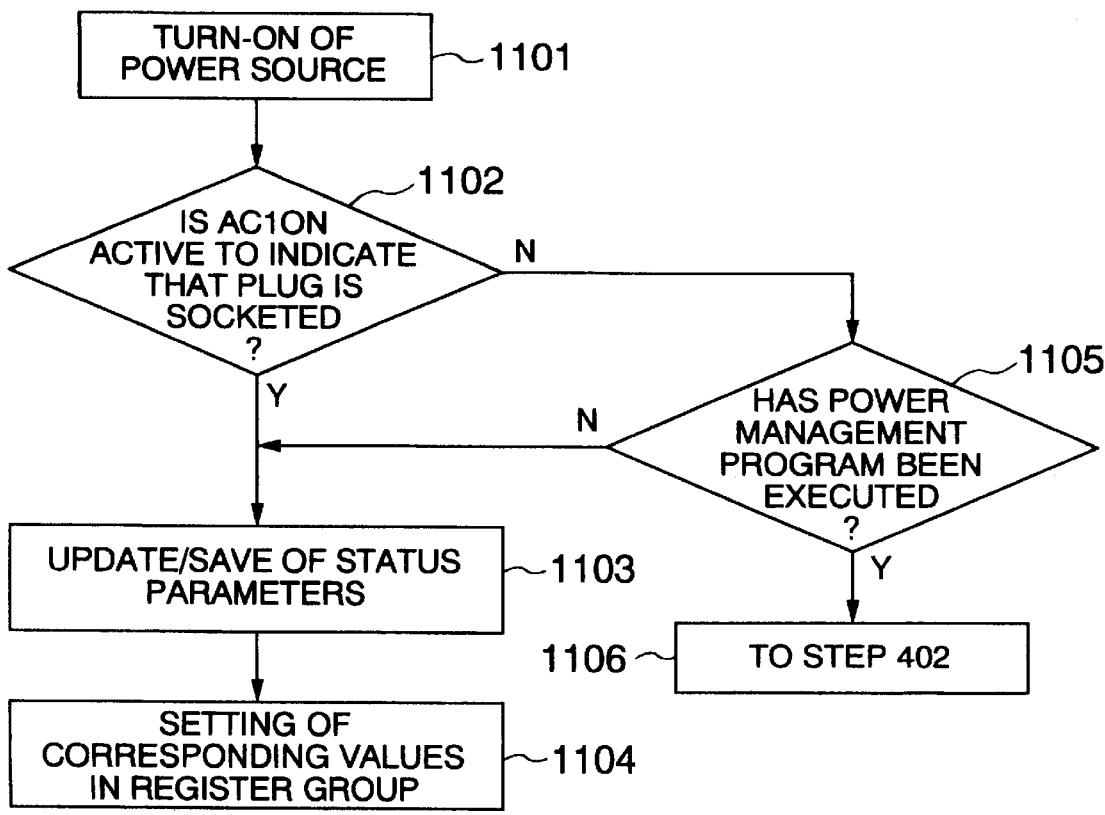
FIG. 11 is a flow chart for explaining control of a power management system in an information processing apparatus according to a fifth embodiment of the present invention.

Referring now to FIG. 11, the operation after the power source of the information processing apparatus is turned on by the user will be described.

A flow chart of FIG. 11 is for explaining control of a power management in an information processing apparatus according to a fifth embodiment of the present invention.

When the user turns on the power source of the information processing apparatus in step 1101, the CPU 10 fetches the signal AC1ON to decide whether or not power is supplied externally of the information processing apparatus in step 1102. If power is supplied externally and the signal AC1ON is active, the program proceeds to step 1103 but if power is not supplied externally, the program proceeds to step 1105.

In the step 1103, the CPU 10 updates the values of the status parameters to their maximum values and saves the thus updated values in the memory 30.

Further, in step 1104, corresponding values are written in the registers 22A, 22B and 22C of the bridge 20 shown in FIG. 2 and in the register group 104 of the battery controller 100 shown in FIG. 5. The bridge 20 generates clocks CLK1 to CLK3 at a frequency or frequencies corresponding to the written values and the battery controller 100 generates voltages VDD1 to VDD7 corresponding to the written values.

When the signal AC1ON is determined to be inactive in the step 1102, the CPU 10 confirms whether the power source of the information processing apparatus is turned off under the condition that the program of the power management has been executed. If the power source is turned off with the power management program unexecuted, the program proceeds to step 1106 but if turned off with the power management program executed, the program proceeds to the step 1103 and the aforementioned processes of steps 1103 and 1104 are executed.

In the step 1106, by reflecting the fact that the power source is turned off with the program of the power management unexecuted, the program proceeds to the step 402 of the flow chart shown in FIG. 4 to permit the CPU 10 to execute the operation in the power management mode.

According to the present embodiment, even when the power source is turned on, the information processing apparatus can be set to a proper operating condition in accordance with the presence or absence of external supply of power and the execution condition of the power management program during turn-off of the power source even when the power source is turned on.

Figure 12:
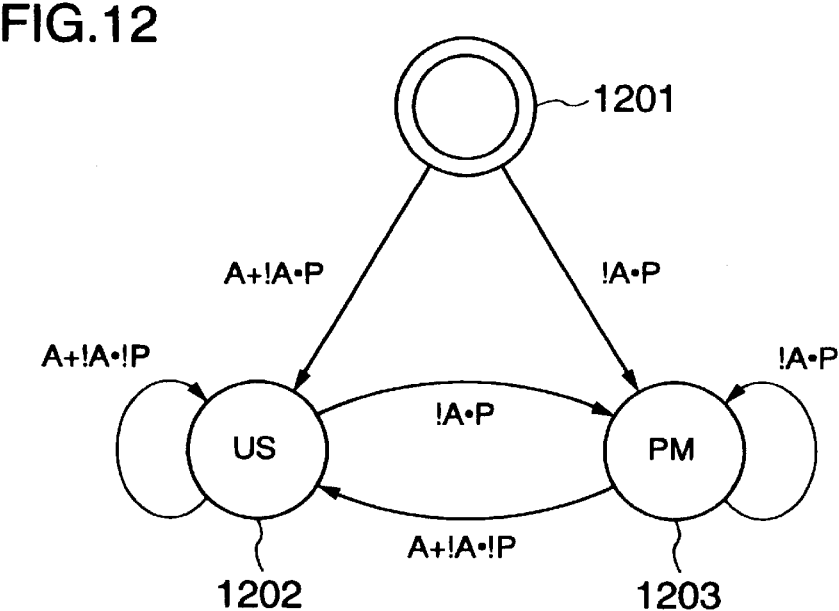
FIG. 12 is a state transition diagram of control of the power management system in the information processing apparatus according to the first to fifth embodiments of the present invention.

Referring now to FIG. 12, flow of transition of three states, that is, the power supply turn-off of power source of the information processing apparatus, the power management mode and non-power management mode, to different states will be described.

State transition of control of the power management system in the information processing apparatus according to the first to fifth embodiments is diagrammatically illustrated in FIG. 12.

In FIG. 12, state 1201 represents a turn-off state of power source of the information processing apparatus. State 1202 represents a normal state in which the frequency of operating clocks is maximum and power delivered out of the battery controller corresponds to the maximum voltage. State 1203 represents a power management executing state in which the frequency and the voltage take values which are below their maximum values.

In FIG. 12, "A" is abbreviation of AC1ON with "active" being indicated by "A" and "inactive" being indicated by "!A", and "P" represents whether or not the power management program is executed with "executed" being indicated by "P" and "unexecuted" being indicated by "!P".

When the power source is turned on under the condition of the power source turn-off state 1201 of the information processing apparatus, the CPU 10 confirms the AC1ON and the execution state of the power management program. If the plug is socketed or the power management program has not been executed with the plug not socketed, the CPU 10 causes the information processing apparatus to shift to the normal state 1202. This condition is formulated as "A+!A·!P".

If the power management program has been executed with the plug not socketed, the CPU 10 causes the information processing apparatus to shift to the state 1203 in which the power management is carried out. This condition is formulated as "!A·P".

When the knob is moved during operation under the normal state 1202, the CPU 10 causes the information processing apparatus to shift to the state 1203 in which the power management is carried out. This condition is formulated as "!A·P".

So long as the knob is not moved or the plug is socketed, the normal state 1202 is maintained. This condition is formulated as "A+!A·!P".

When the plug is socketed or the knob is moved to the position indicative of OFF during operation under the state 1203 of execution of the power management, the CPU 10 causes the information processing apparatus to shift to the normal state 1202. This condition is formulated as "(A+!A)·!P". So long as the plug is not socketed and the knob is not moved to OFF, the state 1203 of execution of the power management is maintained. This condition is formulated as "!A·P".

Referring now to FIGS. 13 to 19, a description will be given of an instance where the knob is not displayed on the screen but a power management switch of slide type is added to the information processing apparatus proper.

Figure 13:
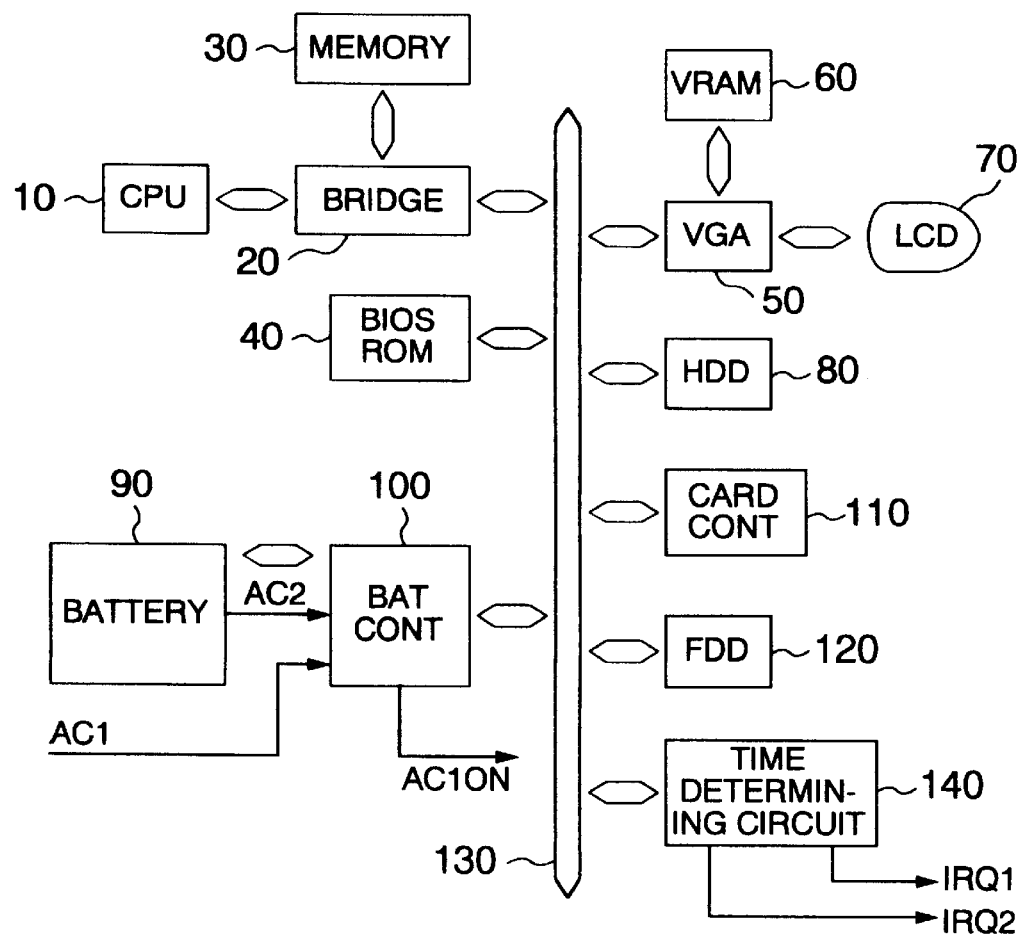
FIG. 13 is a block diagram showing the overall construction of an information processing apparatus according to a sixth embodiment of the present invention.

The overall construction of an information processing apparatus according to a sixth embodiment of the present invention is shown in block diagram form in FIG. 13.

In FIG. 13, the construction and operation of CPU 10, bridge 20, main memory 30, BIOS ROM 40, display controller 50, display memory 60, liquid crystal display (LCD) 70, hard disk drive (HDD) 80, battery 90, battery controller (BAT CONT) 100, PCMCIA controller (CARD CONT) 110, floppy disk drive (FDD) 120 and bus line 130 is the same as that explained in connection with FIG. 1 and will not be described here.

In the present embodiment, a time determining circuit 140 is additionally provided. The time determining circuit 140 will be detailed later in construction with reference to FIG. 16 but generally, it is a circuit which converts adjustment setting of a slide type power management switch additionally provided for the information processing apparatus proper into time data and determines a time value to be transferred to the CPU 10. The time determining circuit 140 delivers interruption signals IRQ1 and IRQ2.

The construction of the slide type power management switch additionally provided for the information processing apparatus proper will be described with reference to FIG. 14A and 14B.

Figure 14A:
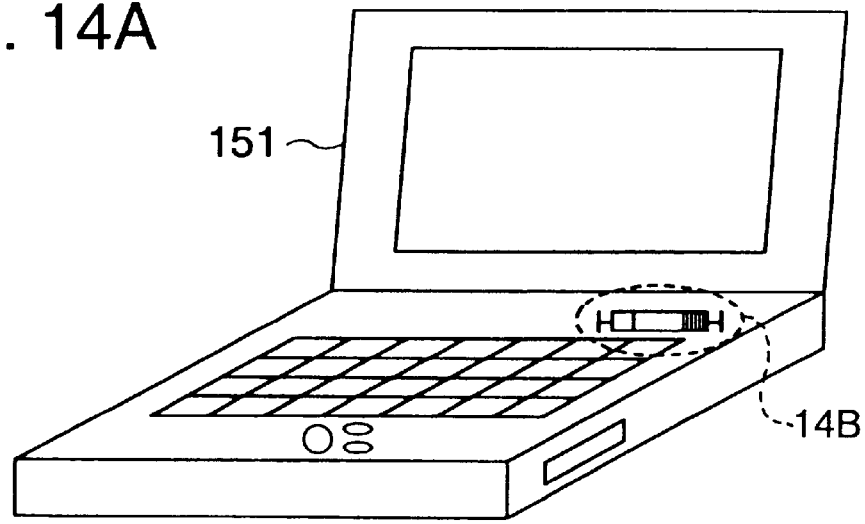
FIGS. 14A and 14B are a perspective view together with an enlarged part showing a construction of a slide type switch in the information processing apparatus according to the sixth embodiment of the present invention.
Figure 14B:
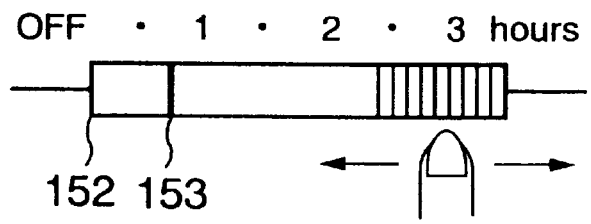

The construction of the slide type switch of the information processing apparatus according to the sixth embodiment of the present invention is shown in perspective view form together with an enlarged part in FIGS. 14A and 14B are.

As shown in FIG. 14B, a slide type power management switch 152 is added to a portion of an information processing apparatus 151 such as a note type personal computer shown in FIG. 14A. Time indicated by this switch 152 is a desired operating time of the information processing apparatus desired by the user. In a state shown in FIG. 14B, a point indicated by a blackened portion (hereinafter referred to as "indicator") 153 of the switch 152 corresponds to the desired operating time of the information processing apparatus, which is between 0.5 hours and 1.0 hour in this illustration.

Figure 15:
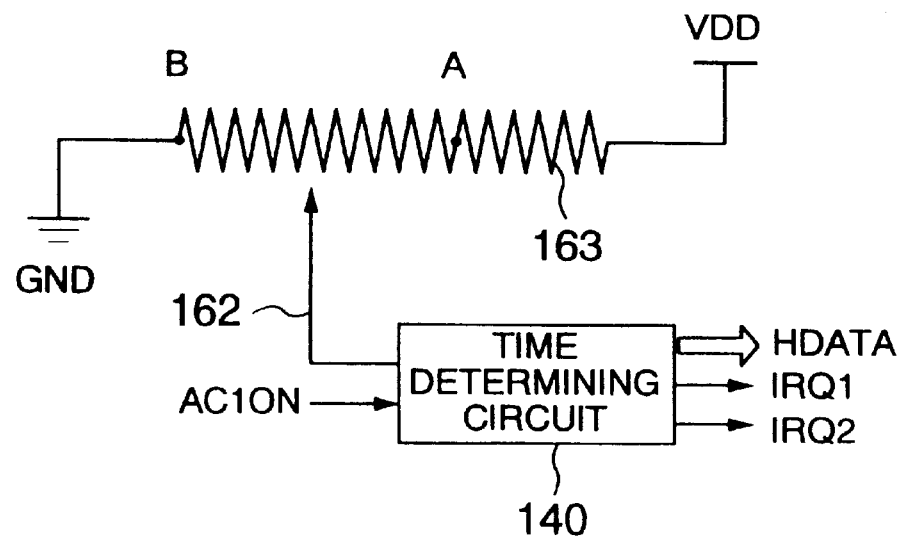
FIG. 15 is a circuit diagram for explaining the relation between the slide type switch and a time determining circuit in the information processing apparatus according to the sixth embodiment of the present invention.

Referring now to FIG. 15, a method of converting the position indicated by the indicator 153 into time data will be described.

FIG. 15 is for explaining the relation between the slide type switch and the time determining circuit in the information processing apparatus according to the sixth embodiment of the present invention.

The slide type power management switch 152 shown in FIG. 14B includes a resistor 163 connected between power source VDD and ground GND and a slider 162 slidable on the resistor 163 in interlocked relation to the indicator 153.

The slider 162 of the indicator 153 is electrically connected to the time determining circuit 140 as shown in FIG. 15 and as the indicator 153 moves, the slider 162 also moves correspondingly. As a result, the potential difference between a position at which the slider 162 contacts the resistor 163 and the time determining circuit 140 changes with the position of the slider 162. Time data (HDATA) is generated from the potential difference and transferred to the CPU 10. As the slider 162 moves from a point B toward a point A, the potential difference increases.

Figure 16:
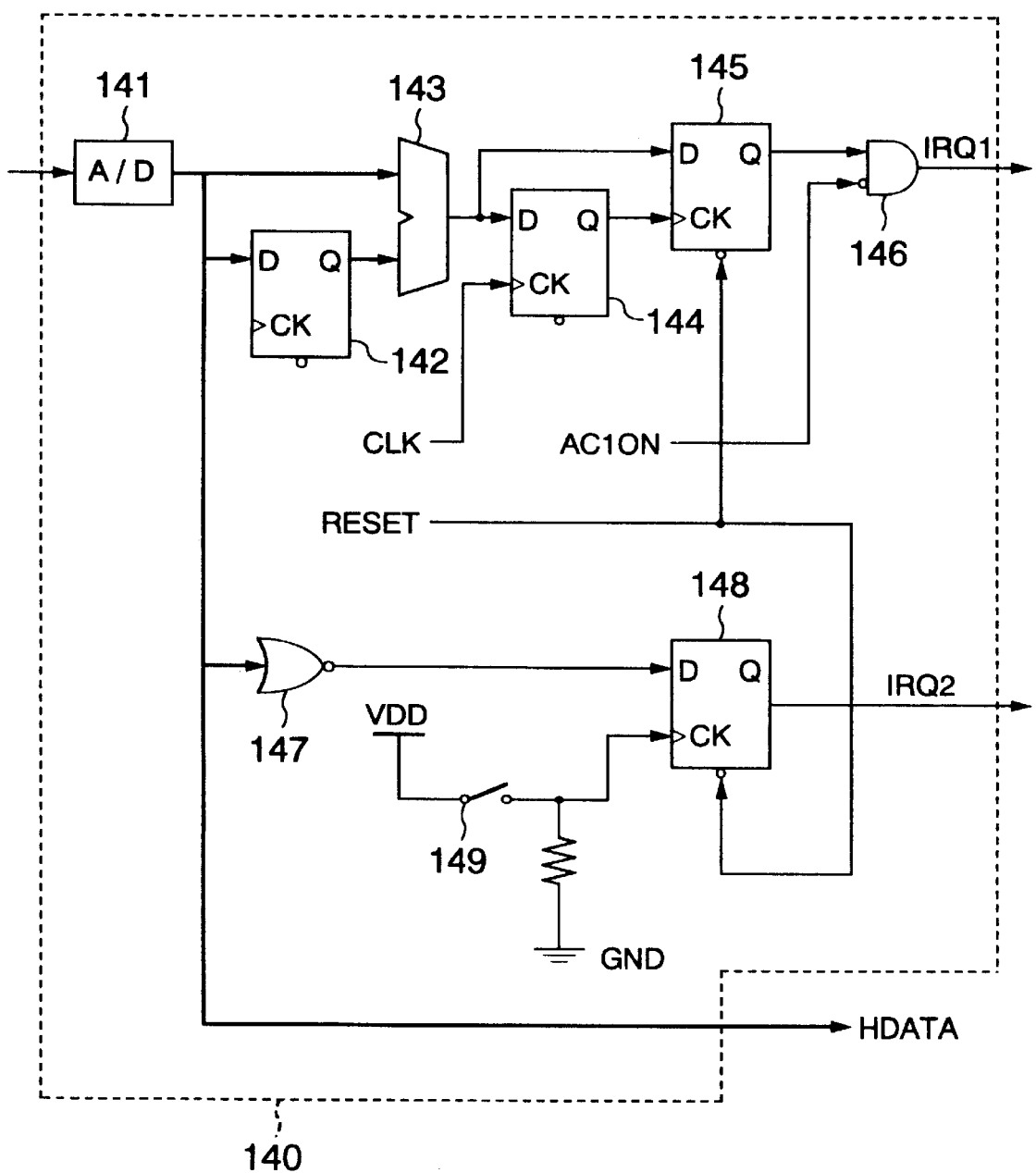
FIG. 16 is a circuit diagram of the time determining circuit used in the information processing apparatus according to the sixth embodiment of the present invention.

Referring now to FIG. 16, the internal construction of the time determining circuit 140 will be described.

The time determining circuit used in the information processing apparatus according to the sixth embodiment of the present invention is shown in circuit diagram form in FIG. 16.

An A/D (Analog/Digital) converter 141 converts the potential difference explained in connection with FIG. 15 into a digital signal of a plurality of bits. The output signal of the A/D converter 141 serves as time data HDATA. A flip-flop 142 is adapted to temporarily store time data prevailing before the switch 152 shown in FIG. 14B moves. More specifically, the flip-flop 142 latches the output signal from the A/D converter 141 at a predetermined timing to temporarily store the time data prevailing before the switch 152 moves.

A comparator 143 compares the time data before the movement of the switch which is stored in the flip-flop 142 with time data after the movement which is an output signal of the A/D converter 141. When the two data pieces differ from each other, the comparator 143 makes its output active and information to this effect is stored in flip-flops 144 and 145. Here, two stages of flip-flops 144 and 145 are used pursuant to a technique of hardware design and this construction is not always necessary.

An output of the flip-flop 145 is ANDed by an inverting signal of the signal AC1ON indicating whether or not the plug is socketed by means of an AND gate 146, and an output of the AND gate 146 serves as the interruption signal IRQ1. Accordingly, the interruption IRQ1 is an interruption signal for bringing the information processing apparatus into the power management mode.

When the power management switch 152 is turned off, all of the output bits from the A/D converter 141 are rendered to be zero to make an output of a NOR gate 147 active. This information is stored in a flip-flop 148. With the power management switch 152 turned off, a switch 149 is turned on. At a rise of this signal, the flip-flop 148 may fetch data. An output of the flip-flop 148 serves the interruption signal IRQ2. Accordingly, the interruption signal IRQ2 is an interruption signal for ending the power management.

The hardware construction described herein is a mere example and obviously, a different construction may be applicable to the present invention.

Figure 17:
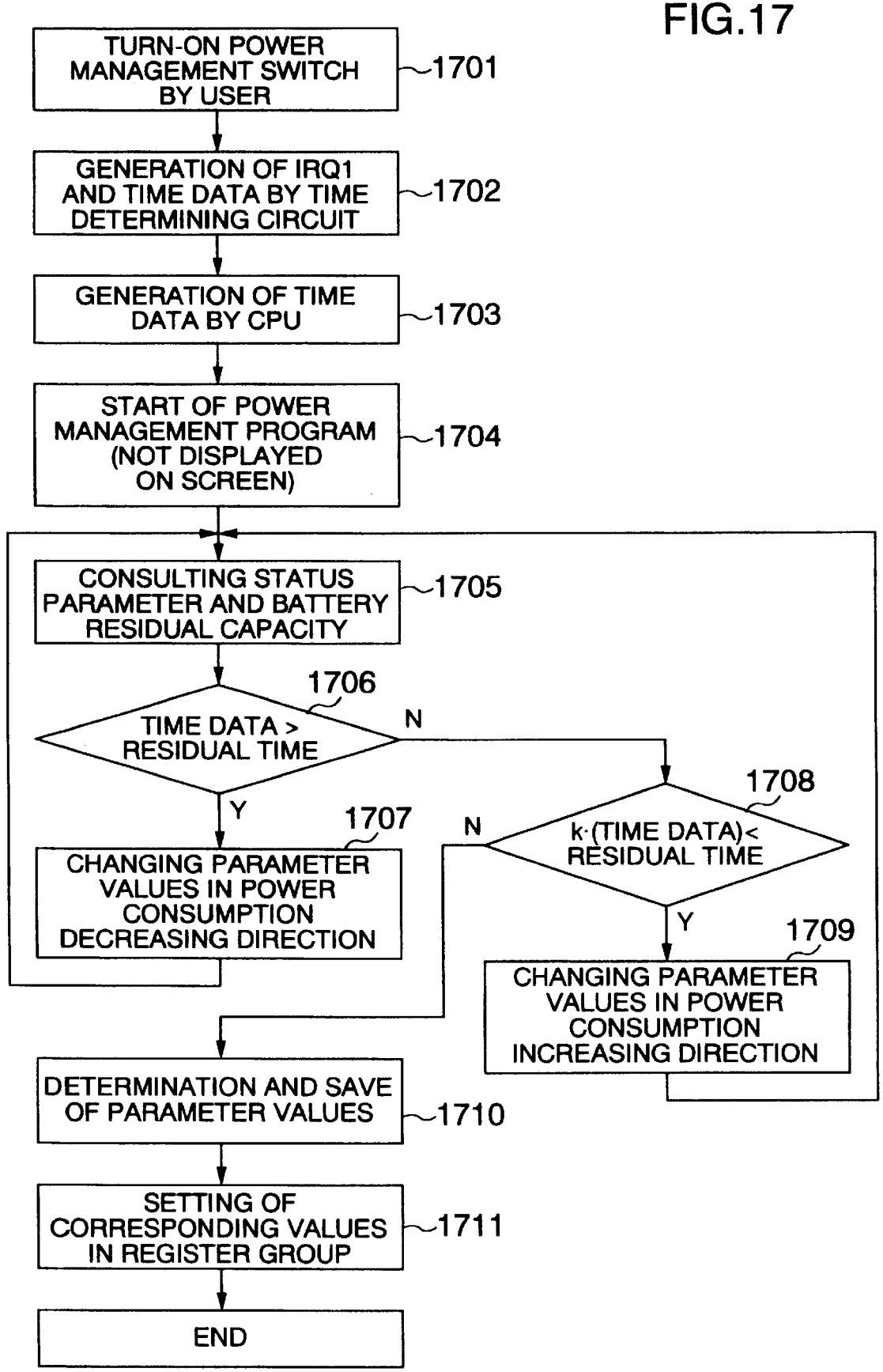
FIG. 17 is a flow chart for explaining control of a power management system in the information processing apparatus according to the sixth embodiment of the present invention.

Referring now to FIG. 17, flow of operation which proceeds before the information processing apparatus is brought into the power management mode.

A flow chart of FIG. 17 is for explaining control of a power management system in the information processing apparatus according to the sixth embodiment of the present invention.

In step 1701, the user moves the slide type switch 152 shown in FIG. 14B to turn on the power management.

Next, in step 1702, the time determining circuit 140 converts a potential difference corresponding to a moving amount of the switch 152 into time data and makes the interruption signal IRQ1 active, as described in connection with FIG. 16.

In step 1703, the CPU 10 detects the activated interruption signal IRQ1 and thereafter, fetches the time data.

In step 1704, the CPU 10 executes the program for bringing the information processing apparatus into the power management mode.

Ensuing steps 1705 to 1711 correspond to the steps 404 to 410 shown in FIG. 4 and processes in the steps 1705 to 1711 will be described briefly.

In the step 1705, the CPU 10 confirms the status of the information processing apparatus. By consulting the status parameters shown in FIG. 6 and the residual capacity of the battery, the CPU 10 calculates a battery operable time.

In the step 1706, the CPU 10 decides whether or not the battery operable time (residual time) is shorter than the time data indicative of a desired operating time sent from the time determining circuit 140. If shorter, the program proceeds to the step 1707 but if longer, the program proceeds to the step 1708.

In the step 1707, the CPU 10 changes values of the status parameters in a direction of decreasing the power consumption. Conversely, if the residual time is longer than the time data, the program proceeds to the step 1709 in which the CPU 10 changes values of the status parameters in a direction of increasing the power consumption.

By repeating the operation in the steps 1705 to 1709, the battery operable time can be rendered to be substantially equal to the time data.

Subsequently, the CPU 10 saves the values of the status parameters at that time in the step 1710 and, in the step 1711, the CPU 10 writes values corresponding to the status parameters at that time into the registers 22A, 22B and 22C of the bridge 20 shown in FIG. 2 and in the register group of the battery controller 100 shown in FIG. 3.

The bridge 20 generates clocks CLK1 to CLK3 at a frequency or frequencies corresponding to the written values and the battery controller 100 generates voltages VDD1 to VDD7 corresponding to the written values.

In the event that even with the speed of the CPU and the brightness of backlight downgraded, a battery operable time desired by the user cannot be obtained, a message to this effect such as an alarm may be raised.

According to the present embodiment, the power management system as described above is employed, so that the user can assure a desired battery operable time easily by merely adjusting the switch of the information processing apparatus proper and designating a desired operating time of the information processing apparatus.

Conventionally, the battery is consumed even while the user adjusts the speed of the CPU and the brightness of backlight until a sufficient battery operable time is reached and consequently, the battery operable time is shortened by the time required for the adjustment. In the present embodiment, however, adjustment can be finished within a very short time and hence the consumption of the battery can be prevented.

Figure 18:
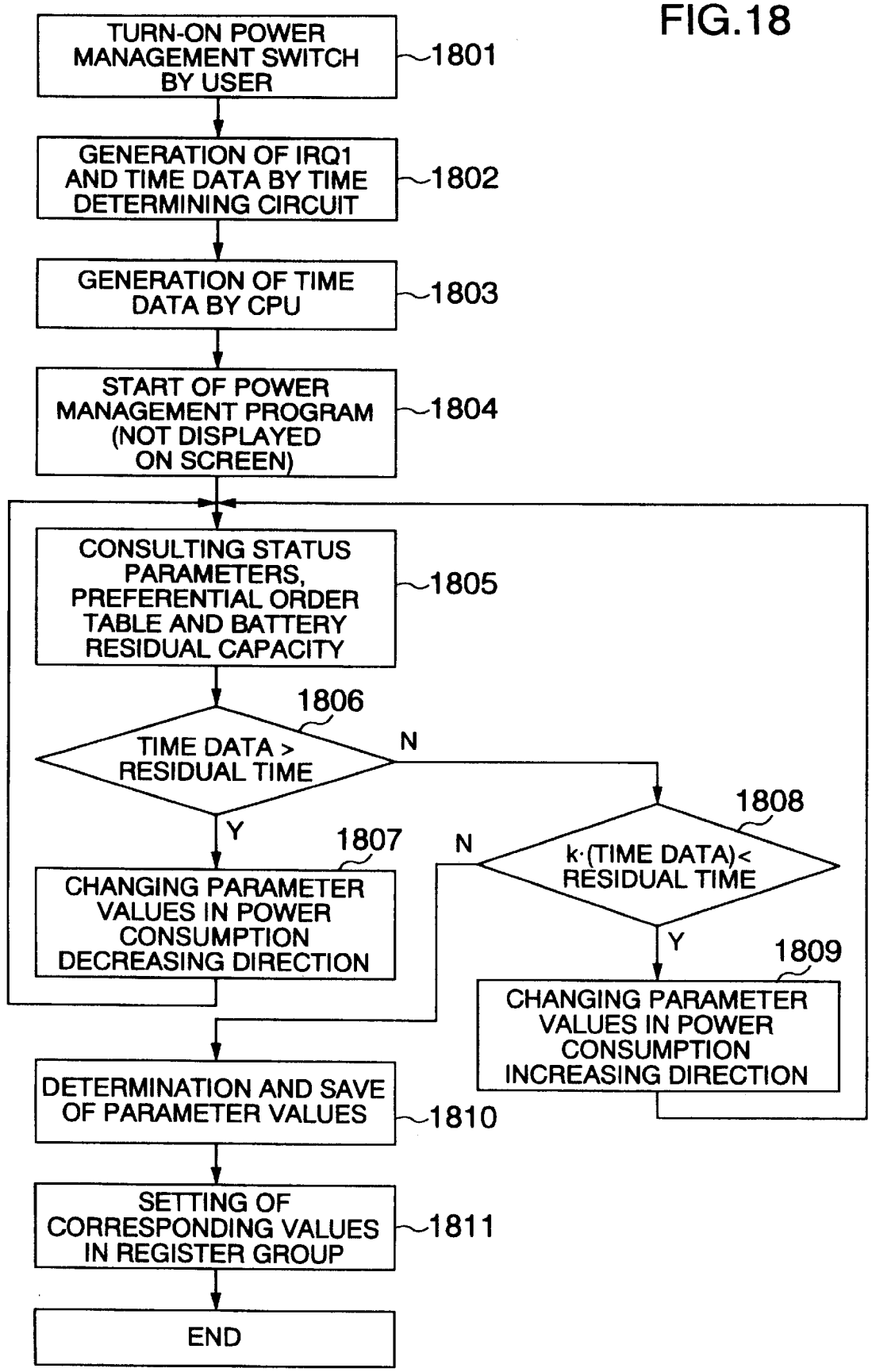
FIG. 18 is a flow chart for explaining control of a power management system in an information processing apparatus according to a seventh embodiment of the present invention.

Referring now to FIG. 18, the operation to be carried out before the power management mode is set up by consulting the preferential order table will be described.

A flow chart of FIG. 18 is for explaining control of a power management system in an information processing apparatus according to a seventh embodiment of the present invention.

Processes in steps 1801 to 1804 are similar to those in the steps 1704 to 1710 of FIG. 17.

Processes in steps 1805 to 1811 are similar to those in the steps 704 to 710 of FIG. 7.

A battery operable time is calculated by consulting the status parameters, the preferential order table and the battery residual capacity and if the battery operable time is shorter than time data, values of the status parameters are downgraded starting from an item corresponding to lower one of ranks of the preferential order table. Conversely, if longer, values of the status parameters are upgraded starting from an item corresponding to upper one of ranks of the preferential order table.

By repeating the operation in the steps 1805 to 1809, the battery operable time can be rendered to be substantially equal to the time data and values of the status parameters at that time are saved and corresponding values are set in the register group.

In the event that even with the speed of the CPU and the brightness of backlight downgraded, a battery operating time desired by the user cannot be obtained, a message to this effect such as alarm may be raised.

While in the foregoing description the time date is so controlled as to substantially equal the residual time by repeating the steps 1806 to 1809, the program may shift to the step 1810 at the time that the decision result in the step 1806 turns to taking "NO", that is, the time data becomes smaller than the residual time. Through this, the processing time of the power management system can be reduced.

In the above description, the steps 1807 and 1809 are executed in accordance with the preferential order ranks set in the preferential order table. Obviously, in the operation to be carried out in the steps 1805 to 1809, the preferential order table may be consulted in a way different from that described as above. For example, in the step 1807, the status parameters may not be downgraded starting from an item corresponding to lower one of the preferential order ranks but a status parameter value corresponding to an item having a preferential order rank which is imminently larger than the other may be downgraded. For example, the brightness "Light"of backlight of the liquid crystal display (LCD) 70 may be downgraded.

In the step 1809, too, the status parameters may not be upgraded starting from an item corresponding to higher one of the preferential order ranks but a status parameter value corresponding to an item having a preferential order rank which is imminently lower than the other may be upgraded. For example, the non-access time "FD" of the floppy disk drive 120 or the non-access time "HD" of the hard disk drive (HDD) 80 shown in FIG. 6 may be upgraded. Further, in an instance where the status parameters have values which are imminently larger and lower than the other, a certain rule may be established between the status parameter value and the preferential order table and the status parameter value may be changed in accordance with the rule.

According to the present embodiment, the power management system as described above is employed, so that the user can assure a desired battery operable time easily by merely adjusting the switch added to the information processing apparatus and designating a desired operating time of the information processing apparatus.

Conventionally, the battery is consumed even while the user adjusts the speed of the CPU and the brightness of backlight until a sufficient battery operable time is reached and consequently, the battery operable time is shortened by the time required for the adjustment. In the present embodiment, however, adjustment can be finished within a very short time and hence the consumption of the battery can be prevented.

Since the preferential order table settable by the user is used to execute the process of decreasing the power consumption and the process of increasing the power consumption in accordance with the preferential order, the power management can be executed in conformity with the user-oriented preferential order.

Next, a description will be given of the operation in the case where while the plug is socketed and the information processing apparatus is externally supplied with power, the user turns on the power management switch.

In the operation in this case, as explained in connection with the flow chart shown in FIG. 10, if power is supplied externally with the plug of the information processing apparatus socketed when the user turns on the power management switch 152, that is, if the AC1ON is active, the status at present is maintained. If the AC1ON is inactive, the operation is started from the step 1702 of FIG. 17.

Next, the operation to be carried out after the user turns on the power source of the information processing apparatus will be described.

In the operation in this case, as explained in connection with the flow chart shown in FIG. 11, after the user turns on the power source of the information processing apparatus, the CPU 10 fetches the interruption signal AC1ON to decide whether or not the information processing apparatus is externally supplied with power. If the interruption signal AC1ON is active or if the AC1ON is inactive and the power management switch is off, the CPU 10 updates values of the status parameters to their maximum values and save the updated values. Then, the CPU writes corresponding values into the registers 22A, 22B and 22C of the bridge in FIG. 2 and the register group of the battery controller 100 in FIG. 3. This causes the bridge 20 to generate clocks CLK1 to CLK3 at a frequency or frequencies corresponding to the written values and the battery controller 100 to generate voltages VDD1 to VDD7 corresponding to the written values. If the AC1ON is inactive and the switch is on, the operation is started from the step 1702 in FIG. 17.

Figure 19:
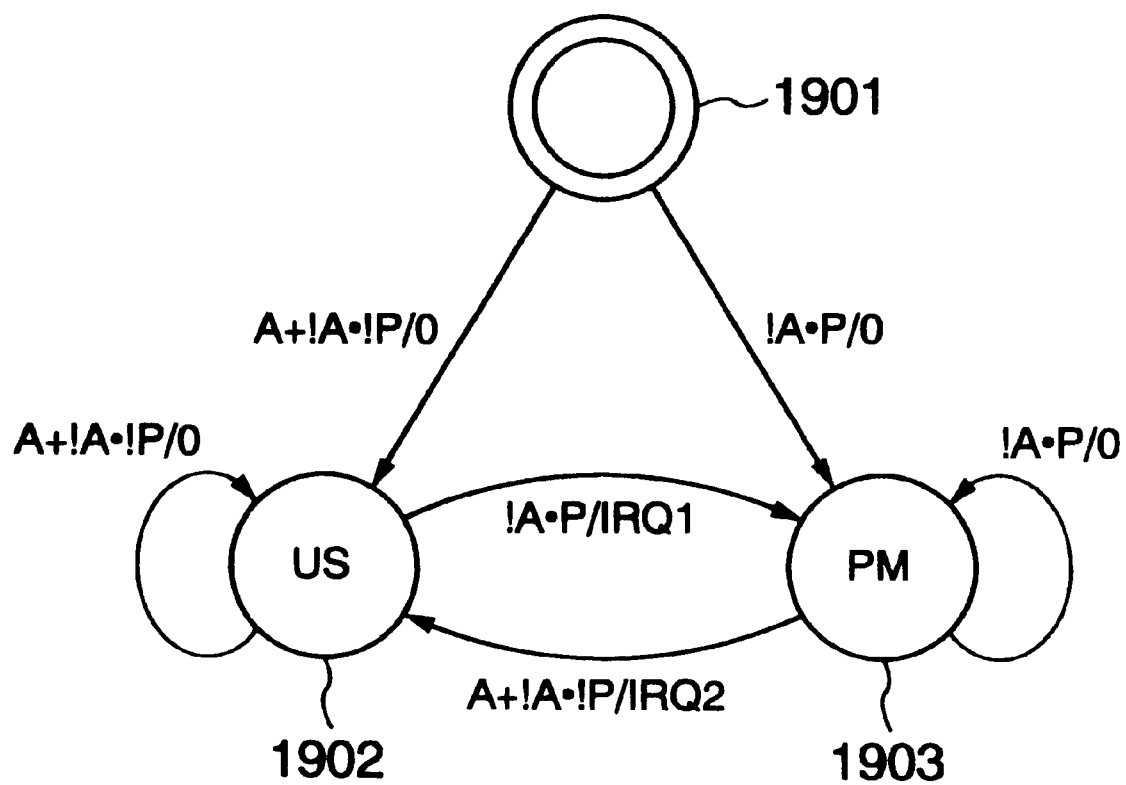
FIG. 19 is a state transition diagram of the power management system in the information processing apparatus according to the sixth and seventh embodiments of the present invention.

Referring now to FIG. 19, flow of transition of three states, that is, the power source turn-off of the information processing apparatus, the power management mode and non-power management mode, to different states will be described.

State transition of control of the power management system in the information processing apparatus according to the sixth and seventh embodiments is diagrammatically illustrated in FIG. 19.

In FIG. 19, state 1901 represents a power source turn-off state of the information processing apparatus. State 1902 represents a normal state in which the frequency of operating clocks is maximum and power delivered out of the battery controller corresponds to the maximum voltage. State 1903 represents a power management executing state in which the frequency and the voltage take values which are below their maximum values.

In FIG. 19, "A" is abbreviation of AC1ON with "active" being indicated by "A" and "inactive" being indicated by "!A", and "P" represents whether or not the power management switch 152 is on with "on" being indicated by "P" and "off" being indicated by "!P".

When the power source is turned on under the condition of the power source turn-off state 1901 of the information processing apparatus, the CPU 10 confirms the interruption signal AC1ON and the state of the power management switch 152. If the plug is socketed or the power management switch is off with the plug not socketed, the CPU 10 causes the information processing apparatus to shift to the normal state 1902. This condition is formulated as "A+!A·P".

If the plug is not socketed and the power management switch is on, the CPU 10 causes the information processing apparatus to shift to the state 1903 of execution of the power management. This condition is formulated as "!A·P".

When the power management switch is turned on during operation under the normal state 1902, the time determining circuit 140 renders active the interruption signal IRQ1 indicating that the switch is turned on. After detecting that the interruption signal IRQ1 is active, the CPU 10 shifts the information processing apparatus to the state 1903 of execution of the power management. This condition is formulated as "!A·P" accompanying "/" followed by IRQ1 which is an activated signal. So long as the power management switch 152 is not turned on or the plug is socketed, the normal state 1902 is maintained. This condition is formulated as "A+!A·P".

When the plug is socketed or the power management switch is turned off during operation under the state 1903 of execution of the power management, the time determining circuit 140 renders active the interruption signal IRQ2 requesting the power management to end. After detecting that the interruption signal IRQ2 is rendered to be active, the CPU 10 shifts the information processing apparatus to the normal state 1902. This condition is formulated as "A +!A·P" accompanying "/" followed by IRQ2 which is an activated signal. So long as the plug is not socketed and the power switch is on, the state 1903 of execution of the power management is maintained. This condition is formulated as "!A·P".

According to the present invention, a desired battery operable time can be assured easily in the information processing apparatus adopting the power management system.

What is claimed is:

1. An information processing apparatus having a central processing unit, input/output units controlled by the central processing unit and a battery for supplying power to said central processing unit and said input/output units, said apparatus comprising:

desired operating time setting means for setting a desired operating time of said information processing apparatus;

operating condition changing means for dynamically changing operating conditions such as power supplied to said central processing unit and said input/output units and frequencies of operating clocks;

a user dynamically settable preferential order table for dynamically setting a preferential order of said central processing unit and said input/output units; and residual capacity detecting means for detecting a residual capacity of said battery, wherein said central processing unit controls, on the basis of the desired operating time set by said desired operating time setting means, the residual capacity of said battery detected by said residual capacity detecting means and said user dynamically settable preferential order table, said operating condition changing means to cause it to dynamically change the operating conditions to substantially increase said desired operating time.

2. An information processing apparatus according to claim 1, wherein said information processing apparatus is supplied with power from an external power source and further comprises external power supply detecting means for detecting whether or not power is supplied externally, and wherein when the external supply of power is detected by said external power supply detecting means, said central processing unit controls said operating condition changing means to cause it to change the operating conditions such as power to be supplied to said central processing unit and said input/output units and the frequencies of the operating clocks such that the operating conditions are so controlled as to be improved.

3. An information processing apparatus according to claim 1, wherein said information processing apparatus is supplied with power from an external power source and further comprises external power supply detecting means for detecting whether or not power is supplied externally, and wherein when the external supply of power is detected by said external power supply detecting means, said central processing unit neglects information from said desired operating time setting means indicating that a desired operating time is set and maintains the operating conditions prevailing before said desired operating time is set.

4. An information processing apparatus according to claim 1, wherein said information processing apparatus is supplied with power from an external power supply and further comprises external power supply detecting means for detecting whether or not power is supplied externally, and wherein when power is supplied externally upon start of electrical conduction to said information processing apparatus, said central processing unit controls, on the basis of a detection signal from said external power supply detecting means, said operating condition changing means to cause it to change the operating conditions to their maximum values.

5. An information processing apparatus according to claim 1 wherein said desired operating time setting means includes a display controller for converting an indication of desired operating time displayed on a display screen of a display which is one of said input/output units into time data of desired operating time.

6. An information processing apparatus according to claim 1, wherein said desired operating time setting means includes a slidable switch provided for said information processing apparatus and a time determining circuit for converting a moving amount of said switch into time data.

7. An information processing apparatus according to claim 1, further comprising means for displaying a content of said user dynamically settable preferential order table, means for inputting an instruction to change the content of said user dynamically settable preferential order table and means for changing the content of said user dynamically settable preferential order table based on said instruction.

* * * * *